United States Patent
Cekorich

(10) Patent No.: US 10,338,270 B2
(45) Date of Patent: Jul. 2, 2019

(54) SENSING SYSTEMS AND METHODS WITH PHASE UNWRAPPING BASED ON A DYNAMIC PHASE CHANGE MODEL

(71) Applicant: HALLIBURTON ENERGY SERVICES, INC., Houston, TX (US)

(72) Inventor: Allen Curtis Cekorich, Northridge, CA (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 57 days.

(21) Appl. No.: 15/322,932

(22) PCT Filed: Jul. 18, 2014

(86) PCT No.: PCT/US2014/047255
§ 371 (c)(1),
(2) Date: Dec. 29, 2016

(87) PCT Pub. No.: WO2016/010561
PCT Pub. Date: Jan. 21, 2016

(65) Prior Publication Data
US 2017/0131431 A1    May 11, 2017

(51) Int. Cl.
*G01V 8/24* (2006.01)
*E21B 47/09* (2012.01)
*E21B 47/12* (2012.01)
*E21B 47/00* (2012.01)
*G01H 9/00* (2006.01)

(52) U.S. Cl.
CPC ............. *G01V 8/24* (2013.01); *E21B 47/00* (2013.01); *E21B 47/091* (2013.01); *E21B 47/123* (2013.01); *G01H 9/006* (2013.01); *G01V 2210/1429* (2013.01)

(58) Field of Classification Search
CPC combination set(s) only.
See application file for complete search history.

(56) References Cited

U.S. PATENT DOCUMENTS

| | | |
|---|---|---|
| 5,903,350 A | 5/1999 | Bush et al. |
| 6,556,509 B1 | 4/2003 | Cekorich et al. |
| | | (Continued) |

FOREIGN PATENT DOCUMENTS

WO    2004/070346    8/2004

OTHER PUBLICATIONS

PCT International Search Report and Written Opinion, dated Apr. 17, 2015, Appl No. PCT/US2014/047255, "Sensing Systems and Methods with Phase Unwrapping Based on a Dynamic Phase Change Model," Filed Jul. 18, 2014, 15 pgs.

(Continued)

*Primary Examiner* — Yong-Suk Ro
(74) *Attorney, Agent, or Firm* — Gilliam IP PLLC

(57) ABSTRACT

A system includes distributed sensors and a receiver that receives signals from the distributed sensors and that produces one or more interferometry signals from the received signals. The system also includes a digitizer to digitize each of the one or more interferometry signals. The system also includes at least one processing unit that processes each digitized interferometry signal to obtain unwrapped phase information and related parameter values. The unwrapped phase information is obtained based on a comparison of a current phase measurement with a reference phase predicted using a dynamic phase change model.

19 Claims, 9 Drawing Sheets

(56) References Cited

U.S. PATENT DOCUMENTS

| 6,778,720 | B1 | 8/2004 | Cekorich et al. |
|---|---|---|---|
| 2007/0165207 | A1 | 7/2007 | Xu et al. |
| 2009/0103100 | A1 | 4/2009 | Froggatt et al. |
| 2012/0067118 | A1 | 3/2012 | Hartog et al. |
| 2012/0237205 | A1 | 9/2012 | Duncan et al. |

OTHER PUBLICATIONS

PCT International Preliminary Report on Patentability, dated Feb. 2, 2017, Appl No. PCT/US2014/047255, "Sensing Systems and Methods with Phase Unwrapping Based on a Dynamic Phase Change Model," Filed Jul. 18, 2014, 12 pgs.

Canadian Application Serial No. 2,953,940; First Examination Report; dated Feb. 27, 2018, 4 pages.

Canadian Application Serial No. 2,953,940; Examiner's Letter, dated Jan. 17, 2019, 3 pages.

FRINGE COUNT PROCESS 1

Measure r once each Cycle:
 F = 0, A0 = 0
 For k = 1 to cycles
  measure A
  D = A − A0
  If $(D<0)$ Then $\{$ If $(\pi+D)<0$ Then F = F+1$\}$ Else $\{$ If $(\pi-D)<0$ Then F = F−1$\}$
  $r[k] = 2\pi F + A$    "at time $\tau[k]$"
  A0 = A
return r

FIG. 8A

FRINGE COUNT PROCESS 2

Measure r once each Cycle:
 rm3 = rm2 = rm1 = 0    $\tau 3 = \tau[1-3]$   $\tau 2 = \tau[1-2]$   $\tau 1 = \tau[1-1]$
 For k = 1 to cycles
  measure A
  predict r
   $\tau 0 = \tau[k]$        $v1 = \dfrac{rm1 - rm2}{\tau 1 - \tau 2}$        $v2 = \dfrac{rm2 - rm3}{\tau 2 - \tau 3}$ $r0 = rm1 + v1 \cdot (\tau 0 - \tau 1) + (v1 - v2) \cdot \dfrac{2 \cdot (\tau 0 - \tau 1)^2}{\tau 1 - \tau 3}$        $f = r0/2\pi$ F = IntegerPart$[f]$        d = f − F        If $(d<0)$ Then $\{F = F−1$   d = d+1$\}$
  A0 = 2$\pi \cdot$d                D = A − A0
  If $(D<0)$ Then $\{$ If $(\pi+D)<0$ Then F = F+1$\}$ Else $\{$ If $(\pi-D)<0$ Then F = F−1$\}$
  rm3 = rm2    $\tau 3 = \tau 2$    rm2 = rm1    $\tau 2 = \tau 1$    $r[k] = rm1 = 2\pi F + A$    $\tau 1 = \tau 0$    k = k+1
return r,$\tau$

FIG. 8B

Table 1

| Fringe Count Process | Amplitude Slew Limit | Amplitude Nyquist Limit | Amplitude For Large T | Amplitude Ratio to Order 0 |
|---|---|---|---|---|
| 1 | $\dfrac{\pi}{2 \cdot \sin\left[\dfrac{\pi}{T}\right]}$ | $\dfrac{\pi}{2}$ | $\dfrac{T}{2}$ | 1 |
| 2A | $\dfrac{\pi}{\left(2 \cdot \sin\left[\dfrac{\pi}{T}\right]\right)^2}$ | $\dfrac{\pi}{4}$ | $\dfrac{T^2}{4\pi}$ | $\dfrac{T}{2\pi}$ |
| 2B | $\dfrac{\pi}{\left(2 \cdot \sin\left[\dfrac{\pi}{T}\right]\right)^3}$ | $\dfrac{\pi}{8}$ | $\dfrac{T^3}{8\pi^2}$ | $\dfrac{T^2}{4\pi^2}$ |

FIG. 10

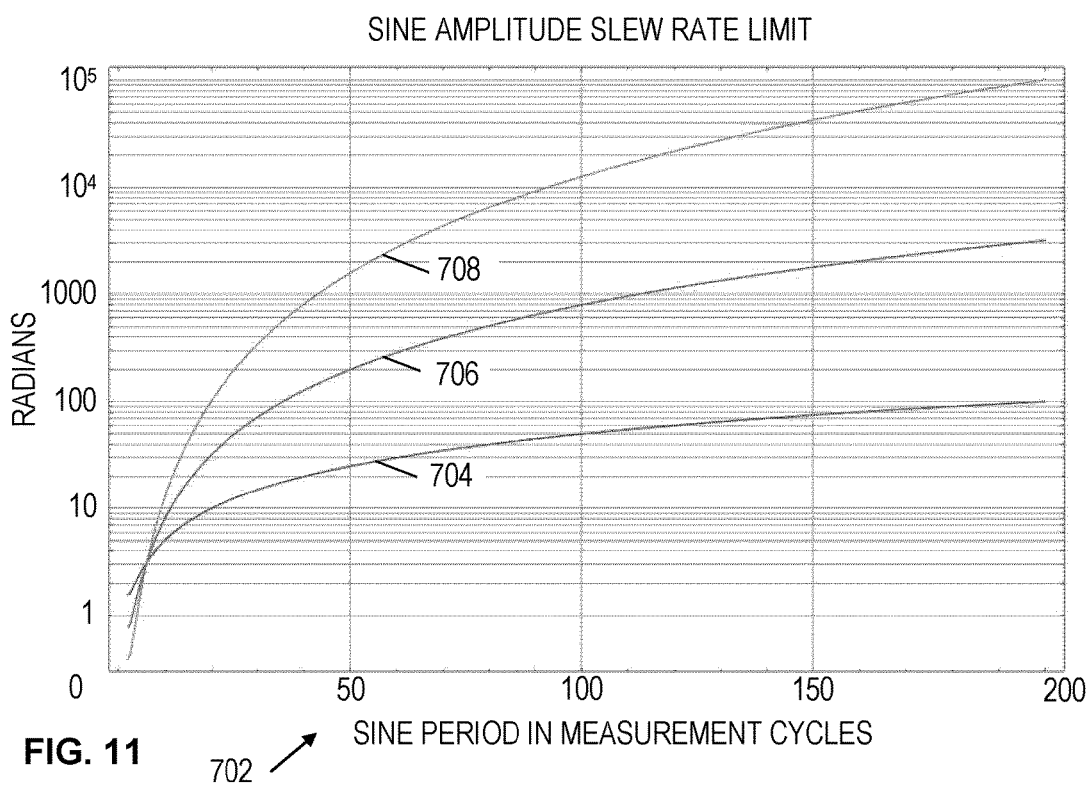

SENSING SYSTEMS AND METHODS WITH PHASE UNWRAPPING BASED ON A DYNAMIC PHASE CHANGE MODEL

BACKGROUND

Fiber optic sensing systems may be used to monitor downhole physical parameters such as vibrations, acoustics, pressure, and temperature. One example sensing system is referred to as distributed sensing. In a distributed sensing system, an interrogation beam is conveyed along an optical fiber, and interferometric techniques are applied to perform phase analysis of backscattered light. The phase information of backscattered light can be correlated with physical parameters at points along the optical fiber. However, recovering phase information accurately is difficult in part due to phase wrapping ambiguities. Some previous efforts to account for phase wrapping use fringe counters to count $2\pi$ phase increments. However, existing fringe counters suffer from inaccuracies if a phase change of more than $\pi$ occurs between a current phase measurement and a previous phase measurement.

BRIEF DESCRIPTION OF THE DRAWINGS

Accordingly, there are disclosed herein sensing systems and methods employing a dynamic phase change model. In the drawings:

FIGS. 8A and 8B are charts showing pseudo-code for fringe count processes.

FIG. 10 is a table showing parameters for different fringe count processes.

FIG. 11 is a graph showing a relative performance of different fringe count processes.

Figure 1:
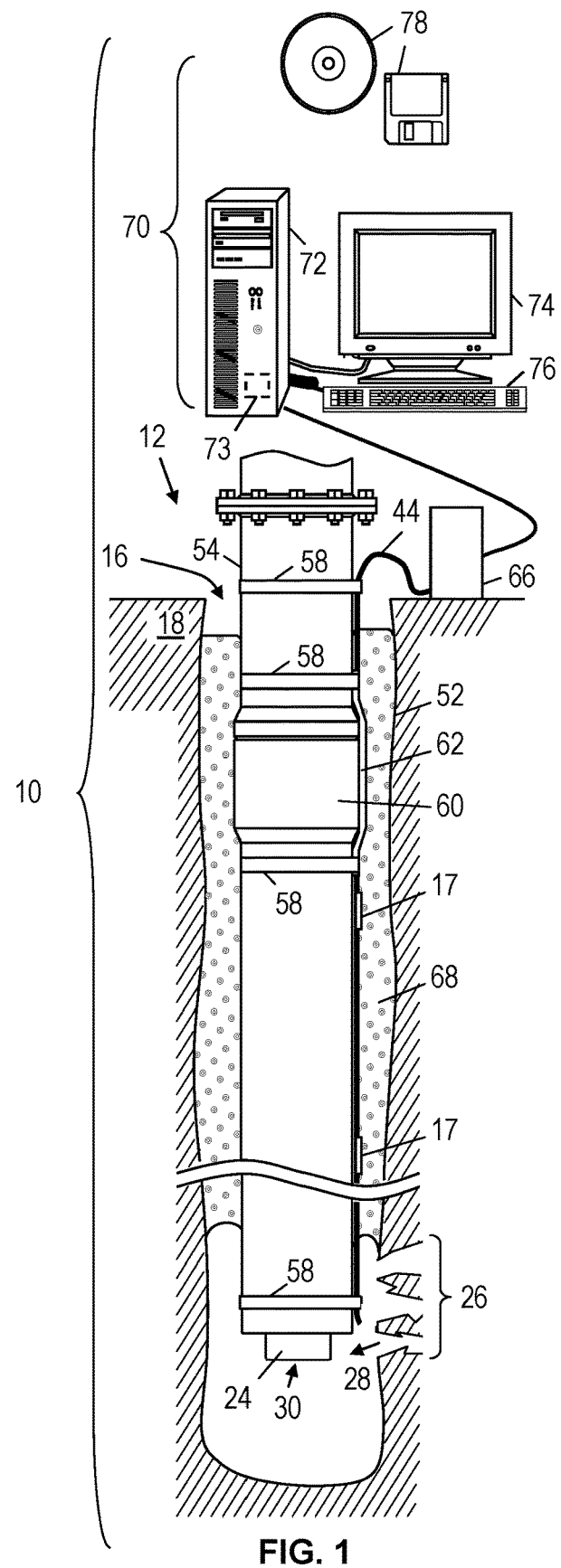
FIG. 1 is a schematic diagram showing an optical sensing well environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The problems outlined above are at least in part addressed by performing phase unwrapping using a dynamic phase change model. The dynamic phase change model may be used, for example, with fringe counting operations and may include a phase change velocity component and/or a phase change acceleration component.

In at least some embodiments, a related system includes distributed sensors and a receiver that receives signals from the distributed sensors and that produces one or more interferometry signals from the received signals. The system also includes a digitizer to digitize each of the one or more interferometry signals. The system also includes at least one processing unit that processes each digitized interferometry signal to obtain unwrapped phase information and related parameter values. The unwrapped phase information is obtained based on a comparison of a current phase measurement with a reference phase predicted using a dynamic phase change model.

The disclosed techniques are best understood in an application context. Turning now to the figures, FIG. 1 shows an illustrative optical sensing well environment 10. In well environment 10, a drilling rig has been used to drill and complete well 12 in a typical manner, with a casing string 54 positioned in the borehole 16 that penetrates into the earth 18. The casing string 54 includes multiple tubular casing sections (usually about 30 feet long) connected end-to-end by couplings 60. (FIG. 1 is not to scale). Typically the casing string includes many such couplings.) Within the well 12, a cement slurry 68 has been injected into the annular space between the outer surface of the casing string 54 and the inner surface of the borehole 16 and allowed to set. A production tubing string 24 has been positioned in an inner bore of the casing string 54.

The well 12 is adapted to guide a desired fluid (e.g., oil or gas) from a bottom of the borehole 16 to a surface of the earth 18. Perforations 26 have been formed at a bottom of the borehole 16 to facilitate the flow of a fluid 28 from a surrounding formation into the borehole and thence to the surface via an opening 30 at the bottom of the production tubing string 24. Note that this well configuration is illustrative and not limiting on the scope of the disclosure. For example, fluid flow to or from a formation is possible at other points along the well 12 (not only at the bottom). Further, the well 12 may correspond to a production well or injection well. Alternatively, optical distributed sensing as described herein may be deployed with a monitoring well.

The optical distributed sensing well environment 10 includes an interface 66 coupled to a fiber optic cable 44 for distributed downhole sensing. The interface 66 is located on the surface of the earth 18 near the wellhead, i.e., a "surface interface". In the embodiment of FIG. 1, the fiber optic cable 44 extends along an outer surface of the casing string 54 and is held against the outer surface of the casing string 54 at spaced apart locations by multiple bands 58 that extend around the casing string 54. A protective covering 62 may be installed over the fiber optic cable 44 at each of the couplings 60 of the casing string 54 to prevent the fiber optic cable 44 from being pinched or sheared by the coupling's contact with the borehole wall. The protective covering 62 may be held in place, for example, by two of the bands 58 installed on either side of coupling 60.

In at least some embodiments, the fiber optic cable 44 terminates at surface interface 66 with an optical port adapted for coupling the fiber(s) in cable 44 to a light source and a detector. The light source transmits light pulses along the fiber optic cable 44, which contains a fiber with scattering impurities. As each pulse of light propagates along the fiber, some of the pulse is scattered back along the fiber from every point on the fiber. Thus the entire fiber acts as a distributed sensor. The optical port of the surface interface 66 communicates backscattered light to the detector, which responsively produces interferometry measurements corresponding to different points along the fiber optic cable 44. In different embodiments, the backscattered light may correspond to Rayleigh backscattering, Brillouin backscattering, or Raman backscattering.

Rayleigh backscattering has the highest intensity (compared to Brillouin and Raman backscattering) and is centered at the wavelength $\lambda_0$ injected into the fiber optic cable 44. Rayleigh backscattering is due to microscopic inhomogeneities of refractive index in the waveguide material matrix. Meanwhile, Raman backscattering (due to thermal excited molecular vibration known as optical phonons) has an intensity which varies with temperature T, and Brillouin backscattering (due to thermal excited acoustic waves known as acoustic phonons) has a wavelength which varies with both temperature T and strain $\varepsilon$. Detection of Raman backscattering is typically used in distributed temperature sensing (DTS) systems, due in large part to its direct relationship between temperature T and intensity, and almost negligent sensitivity to strain $\varepsilon$. However, the Raman backscattering intensity is generally significantly less than that of Rayleigh or Brillouin backscattering, giving it a correspondingly lower signal-to-noise ratio. Consequently, it is common practice to sample the Raman backscattering many times and digitally average the readings, which results in an effective sample rate between tens of seconds to several minutes, depending on the desired signal-to-noise ratio, fiber length and desired accuracy.

In other embodiments, sensors may be distributed along a fiber optic cable such as cable 44. Example sensors may include, but are not limited to, mismatch-path interferometers (e.g., a Michelson, Mach Zehnder, or Fabry Perot array of sensors), fiber Bragg gratings (FBGs), or sensors that transduce a downhole parameter change into an optical phase shift (e.g., by modifying the length of the optical fiber). In such case, the optical port of the surface interface 66 may communicate sensor-based light to the detector, which responsively produces interferometry measurements corresponding to different sensors along the fiber optic cable 44. The interferometry measurements obtained from backscattered light or sensor-based light is used to recover phase information corresponding to a downhole parameter sensed at different points along cable 44. As part of the phase recovery process, phase unwrapping using a dynamic phase change model is performed as described herein.

As shown, the optical distributed sensing well environment 10 also includes a computer 70 coupled to the surface interface 66. The computer 70 may control the light source and detector of surface interface 66 and/or may process interferometry measurements to recover phase information. The illustrated computer 70 includes a chassis 72 with at least one processing unit 73. Further the computer 70 includes an output device 74 (e.g., a monitor as shown in FIG. 1, or a printer), an input device 76 (e.g., a keyboard), and non-transient information storage media 78 (e.g., magnetic or optical data storage disks). It should be appreciated that the computer 70 may be implemented in different forms including, for example, an embedded computer permanently installed as part of the surface interface 66, a portable computer that is plugged into or wirelessly linked to the surface interface 66 as desired to collect data, and a remote desktop computer coupled to the surface interface 66 via a wireless link and/or a wired computer network. In at least some embodiments, the computer 70 is adapted to receive the digitized interferometry signals from the surface interface 66 and to responsively determine distributed sensing parameter values as a function of position along the length of the fiber optic cable 44 and time. Example distributed sensing parameters include temperature, acoustic energy, vibrational energy (including active or passive seismic), pressure, strain, deformation, chemical concentrations, nuclear radiation intensity, electromagnetic energy, and/or acceleration.

In at least some implementations, the non-transient information storage media 78 stores a software program for execution by computer 70, where the instructions of the software program cause the computer 70 to recover phase information from digitized interferometry signals received from surface interface 66. As part of the phase recovery process, phase unwrapping using a dynamic phase change model is performed as described herein. With the unwrapped phase information, distributed sensing parameter values at different points along the fiber optic cable 44 (e.g., every 2 meters) can be determined. The instructions of the software program may also cause the computer 70 to display information associated with the unwrapped phase information and/or the distributed sensing parameter values via the output device 74.

In an alternative optical sensing well environment, the fiber optic cable 44 is strapped to the outside of the production tubing 24 rather than the outside of casing 54. Alternatively, the fiber optic cable 44 may be suspended inside production tubing 24 (e.g., using a weight). Other alternative optical sensing well environments employ composite tubing with one or more optical fibers embedded in the wall of the tubing. The composite tubing can be employed as the casing and/or the production string. Alternatively, a fiber optic cable such as cable 44 could be arranged inside or outside of normal, metallic coiled tubing. Further, a fiber optic cable such as cable 44 and a weighted section of transmission line may be run on the end of standard electric cable. In different embodiments, a fiber optic cable such as cable 44 may be deployed downhole via at least one of drill pipe, coiled tubing, slick line or electric line, or is spooled off of a component that is dropped or pumped downhole.

While downhole sensing systems are described herein, it should be appreciated that the disclosed phase unwrapping methodology can be applied to surface sensing systems that recover information using phase demodulation. Further, while optical sensing systems are described herein, it should be appreciated that the disclosed phase unwrapping methodology can be applied to non-optical (e.g., electromagnetic) sensing systems that recover information using phase demodulation.

One suitable use of the disclosed phase unwrapping methodology would be in a sensing system with vector sensors. An example vector sensor would be a fiber optic geophone, where a mass constrained to move in one axis stretches the fiber in proportion to the acceleration caused by a seismic wave. Heavier masses result in more fiber stretch which can be measured by an interferometer as radians of phase shift per g of acceleration. Typically, the scale factor is kept low to avoid phase wrapping in high dynamic seismic fields. However, the disclosed phase unwrapping based on a dynamic phase change model allows for geophone scale factors that are orders of magnitude larger than would otherwise be possible allowing very small accelerations to be measured in the presence of large seismic disturbances.

Figure 2:
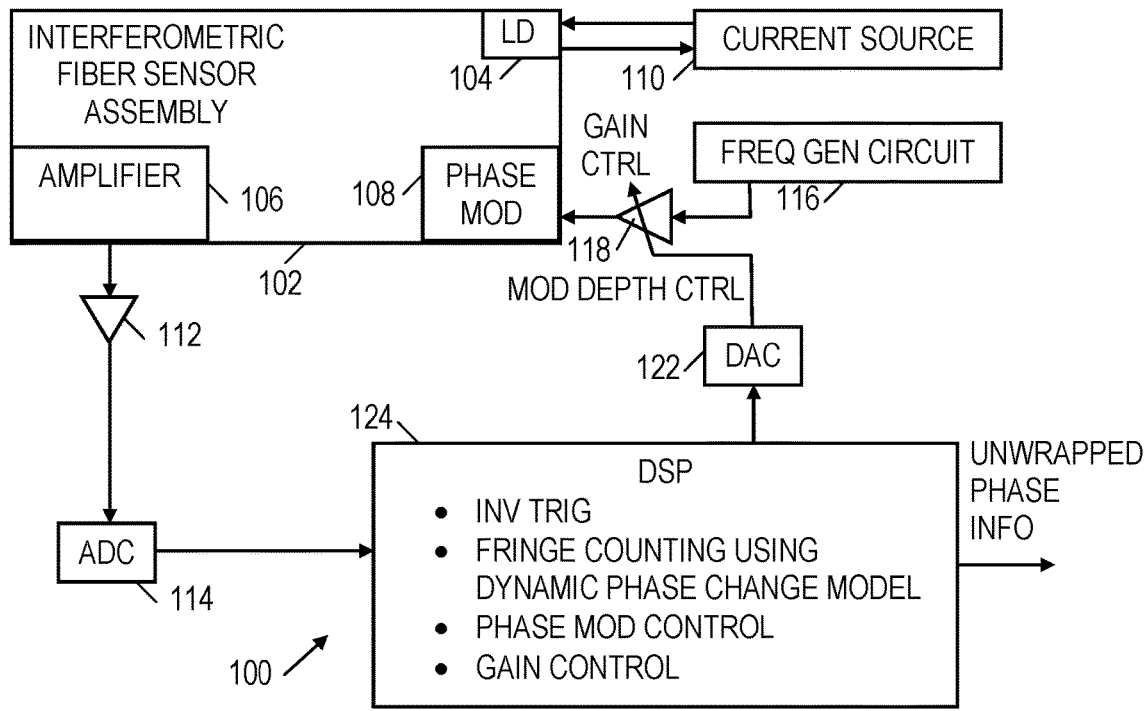
FIG. 2 is a schematic diagram showing optical phase interferometric sensing arrangement.

FIG. 2 depicts an optical phase interferometric sensing arrangement 100 from the perspective of the electronic subsystems. As shown, the arrangement 100 includes an interferometric fiber sensor assembly 102 with a laser diode 104, an amplifier 106 (e.g., a transimpedance amplifier), and a phase modulator 108. As discussed in greater detail below, the interferometric fiber sensor assembly 102 may also include one or more fibers (e.g., corresponding to fiber optic cable 44), sensors, optical couplers, and/or other components that combine backscattered light in a manner that enables interferometric phase sensing.

In operation, the laser diode 104 is driven by current source 110 to generate the optical signal that yields the optical interferometric measurements, based at least in part on the operation of phase modulator 108. The interferometric measurements output from assembly 102 are amplified by amplifiers 106 and/or 112, and provided to an analog-to-digital converter (ADC) 114. The digitized output from ADC 114 is provided to a digital signal processor (DSP) 124 for processing. In at least some embodiments, the DSP 124 performs various operations including, but not limited to, inverse trigonometry (to recover phase information from the digitized interferometry measurements), fringe counting using a dynamic phase change model, phase modulation control, and gain control.

To control the phase modulation, the DSP 124 outputs a digital modulation depth control signal ("MOD DEPTH CTRL") that is converted to an analog signal by digital-to-analog controller (DAC) 122. The analog signal is provided to amplifier 118 to adjust the modulation depth for the amplifier input signal received from frequency generator circuit 116. Further, a gain control signal ("GAIN CTRL") may also be provided by DSP 124 to adjust the gain for amplifier 118.

Figure 3:
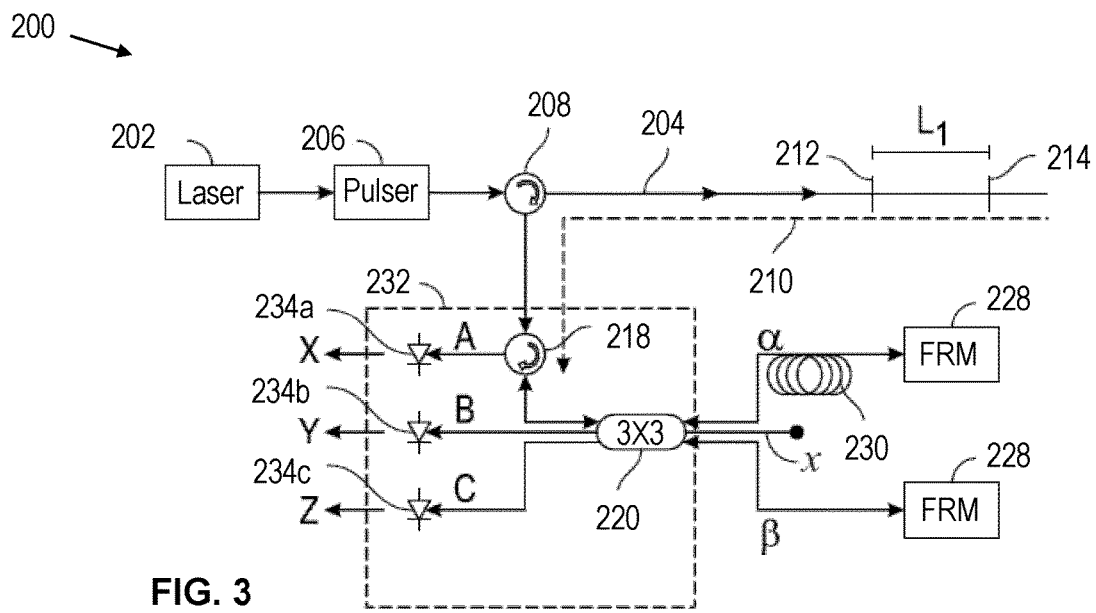
FIG. 3 is a schematic diagram showing an interferometric fiber sensor assembly arrangement.

FIG. 3 shows an example interferometric fiber sensor assembly arrangement 200 from the perspective of the optical subsystems. The arrangement 200 may correspond, for example, to at least part of interferometric fiber sensor assembly 102. While arrangement 200 is representative of a distributed sensing configuration (where the entire fiber optic cable acts as a sensor), it should be appreciated that other configurations employ sensors along the length of a fiber deployed downhole. In assembly 200, a laser 202 (or other light source) generates an interrogation signal that is conveyed along a distributed sensing fiber 204 (e.g., a fiber of fiber optic cable 44). The laser 202 may provide a pulsed or non-pulsed interrogation signal. If a non-pulsed interrogation signal is output from the laser 202, a pulser 206 may be employed to pulse the interrogation signal. The pulsed interrogation signal may then interact with a first circulator 208 which couples the interrogation signal to the distributed sensing fiber 204.

As each interrogation signal pulse travels through the distributed sensing fiber 204, a portion of the pulse energy is reflected due to reflective elements or imperfections along the distributed sensing fiber 204. For illustrative purposes, the reflected signal is depicted in FIG. 3 as return signal 210. In some embodiments, the return signal 210 may be generated from discrete reflective elements placed along the distributed sensing fiber 204, such as fiber Bragg gratings (FBGs) arranged at positions 212 and 214. Alternatively, when performing distributed acoustic sensing (DAS), the return signal 210 may be generated from inherent reflection within the distributed sensing fiber 204 due to fiber imperfections (e.g., impurities). When such scattering occurs elastically, it may correspond to Rayleigh backscatter. In FIG. 3, the backscatter is depicted as occurring at the positions 212 and 214 along the distributed sensing fiber 204. However, those of skill in the art will recognize that there may be numerous other reflection points along the distributed sensing fiber 204.

The first circulator 208 additionally couples the return signal 210 to a receiver 232. In at least some embodiments, the receiver 232 includes a second circulator 218 which conveys the return signal 210 a 3×3 fiber optic coupler 220. The fiber optic coupler 220 distributes the return signal 210 across three paths labeled α, β, x. The x path is terminated with an absorber and is not used further. The α and β paths are each terminated with a Faraday rotator mirror (FRM) 228 that reflects the signals to the fiber optic coupler 220, albeit with a polarization reversal that compensates for any polarization-shifts inadvertently introduced along the α and β paths. A delay coil 230 is included in the α path to introduce a delay in the reflected signal relative to the signal reflected along the β path. Further, a dither signal or phase modulation may be introduced in either of the α or β paths to facilitate distributed sensing data recovery as described herein.

The fiber optic coupler 220 combines the signals from the α and β (and the unused x) paths to form three optical interferometry signals A, B, C. The delay introduced between the α and β paths corresponds to the distance or "sensing window" L1 between the reflection points 212, 214 on the distributed sensing fiber 204, enabling the phase change incurred over this length to be measured and monitored as an interferometric signal phase. Due to the nature of the fiber optic coupler 220, the optical interferometry signals A, B, C have mutual phase separations of 120°. For example, as the α and β signals enter the 3×3 coupler 220, the interferometric signal A exiting the fiber optic coupler 220 may be $\alpha+\beta\angle 0°$, B may be $\alpha+(\beta\angle+120°)$, and C may be $\alpha+(\beta\angle-120°)$.

The optical phase interferometric sensing arrangement 100 also implements single-ended detectors 134a-134c, which receive the optical interferometry signals A, B, and C and output signals X, Y, and Z. Examples of single-ended detectors 134a-134c include p-intrinsic-n field-effect-transistors (PINFETs), where optical receivers and high gain transimpedance amplifiers are used. In at least some embodiments, the single-ended detectors 134a-134c correspond to square law detectors with a bandwidth much lower than the optical frequency (e.g., less than 1 GHz). In an exemplary operation, measurements such as dynamic strain, acoustics, and vibrations may be determined through analysis of the outputs of the single-ended detectors 134a-134c to determine the associated optical phase shift. For more information regarding optical phase demodulation using an optical phase interferometric sensing arrangement such as arrangement 100, reference may be had to International Application Number PCT/US14/19232, entitled "Interferometric High Fidelity Optical Phase Demodulation" and filed Feb. 28, 2014.

It should be appreciated that the foregoing sensing arrangement is only one illustrative context for employing the phase unwrapping methodology disclosed below. Other suitable sensing arrangements exist and include, for example, the sensing arrangements described in U.S. Pat. No. 7,764,363 and U.S. Pat. Pub. No. 2012/0067118. In general, the disclosed phase unwrapping methodology may be applied to any distributed sensing system, where interferometric phase demodulation is used to track a physical parameter such as strain, acoustics, vibrations, etc.

Figure 4:
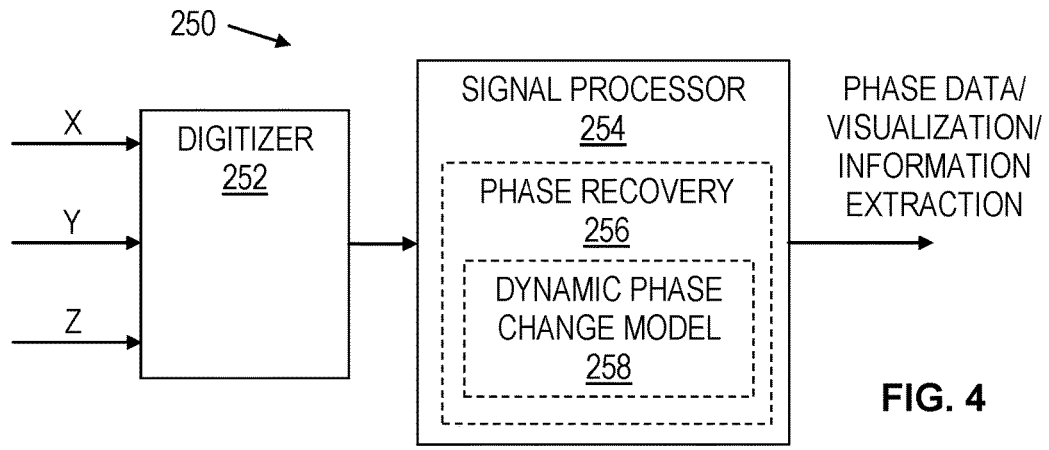
FIG. 4 is a block diagram showing a signal processing arrangement.

FIG. 4 shows an illustrative signal processing arrangement 250 having a digitizer 252 (e.g., ADC 114) that digitizes phase modulated signals such as X, Y, Z, and signal processor 254 (e.g., DSP 124) that receives the digitized signals from the digitizer 252 and at least optionally converts them into a quadrature (i.e., "complex") signal representation. In accordance with at least some embodiments, the signal processor 254 comprises a phase recovery module 256 (e.g., to perform quadrature demodulation of phase) with a dynamic phase change model 258. For example, the signal processor 254 may correspond to one or more central processing unit (CPUs) or application-specific integrated circuits (ASICs) that execute software or firmware instructions corresponding to phase recovery module 156 with dynamic phase change model 258. The output of the signal processor 154 corresponds to unwrapped phase information that can be stored, visualized, correlated with distributed sensing parameters, and/or used for other information extraction.

In some embodiments, at least some of the components represented in arrangements 100, 200 and 250 may be implemented with surface interface 66 and/or computer 70. As an example, the laser 202, pulser 206, and first circulator 208 may be part of an interrogator included with surface interface 66. Further, the receiver 232, and α and β paths may correspond to receiver or interferometry components included with surface interface 66. Further, the digitizer 252 may be included with surface interface 66. Meanwhile, the signal processor 254 may be part of surface interface 66 or computer 70.

Figure 5:
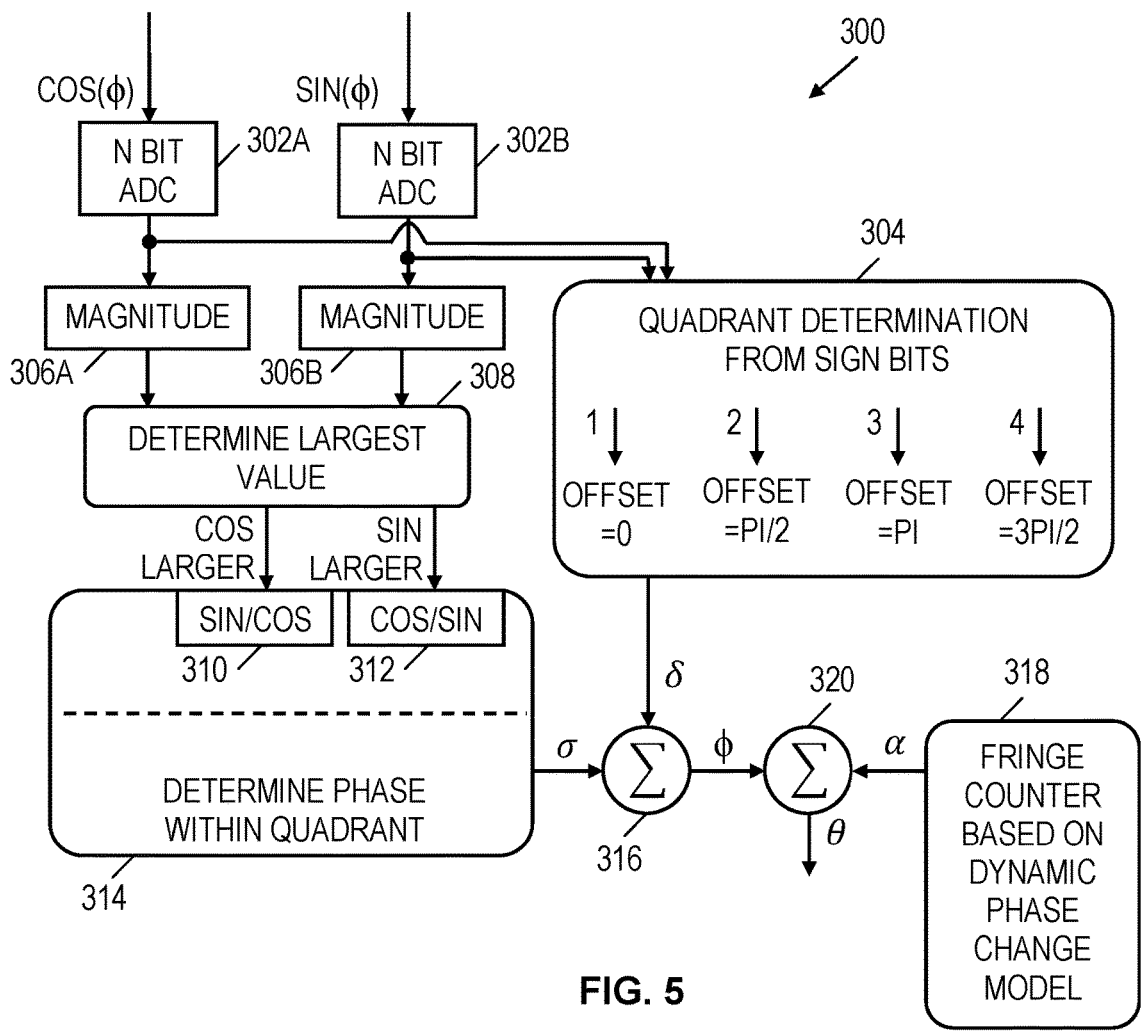
FIG. 5 is a block diagram showing a phase demodulation process.

FIG. 5 is a block diagram showing a phase demodulation process 300. The phase demodulation process 300 may be performed, for example, by computer 70, DSP 124, or signal processor 254. For process 300, a Phase Generated Carrier (PGC) signal resulting from driving the interferometer's phase modulator (e.g., phase modulator 108) with a sinusoidal signal is assumed. The simplified expression of the received signal of the interferometer employing the PGC signal is given as:

$$P(t) = \cos\{\beta \sin(\omega t) - \phi\} + i \sin\{\beta \sin(\omega t) - \phi\},$$

where $\phi$ is the phase of the interferometer (includes sensed signal and offset terms), $\beta$ is the PGC modulation index (expressed in peak radians), and $\omega$ is the frequency of the PGC phase modulation. The object of the phase demodulation process 300 is to digitally process the quadrature terms $\cos \phi$ and $\sin \phi$ so that the term $\phi$ may be measured.

In process 300, the obtained $\cos \phi$ and $\sin \phi$ are digitized respectively by ADC 302A and 302B (if not already obtained in digitized form). The magnitude 306A for $\cos \phi$ and the magnitude 306B for $\sin \phi$ are determined. At block 308, the magnitudes 306A and 306B are compared. If the magnitude of 306A is largest, divide step 310 is performed to determine a ratio of the magnitudes 306A and 306B (a value between 0 and 1). On the other hand, if the magnitude 306B is largest, divide step 312 is performed to determine a ratio of the magnitudes 306A and 306B (a value between 0 and 1). At block 314, an inverse trigonometric process is performed to determine a phase value ($\sigma$) within a quadrant. Meanwhile, at block 304, a quadrant value ($\delta$) is determined using a sign checking process. The value for a is added to the value for $\delta$ at block 316, resulting in $\phi$. The process 300 also employs a fringe counter 318 that adjusts the phase $\phi$ by +/−360°. For more information regarding phase demodulation, reference may be had to Bush J. and Cekorich A., *Multi-Channel Interferometric Demodulator*, Third Pacific Northwest Fiber Optic Sensor Workshop, May 6, 1997, SPIE VOL 3180. In accordance with at least some embodiments, a fringe counter (e.g., fringe counter 318) used for phase demodulation employs a dynamic phase change model. For the sake of comparison, a description of phase wrapping/unwrapping and fringe counting with and without a dynamic phase change model follows.

Interferometry Overview

In single mode interferometry, an electric field E from a light source is split into two fields, $E_1$ and $E_2$, which travel along different optical paths eventually joining to form a field that is the sum of both. Interference occurs at the output of the interferometer and the output optical power varies with the optical properties of the two paths. Single mode interferometers may comprise optical fibers and fiber optic components such as couplers, isolators, mirrors and fiber pigtailed light sources, detectors, and/or other components (see e.g., the components in arrangements 100 and 200). Many approaches exist to use measurements of the optical power to determine the phase difference between the fields $E_1$ and $E_2$. Further, in at least some embodiments, sensors can be constructed that change the optical path followed by the electric field $E_1$ differently than that of $E_2$ and the measured phase difference becomes the output of the sensor. Each sensor or optical fiber responds to a disturbance that induces a phase shift named R between the two fields and the optical power is sampled and processed to give a measurement of R named r. The desire is that the measured phase r is an accurate representation of the sensor phase R.

Phase Wrapping

Figure 6A:
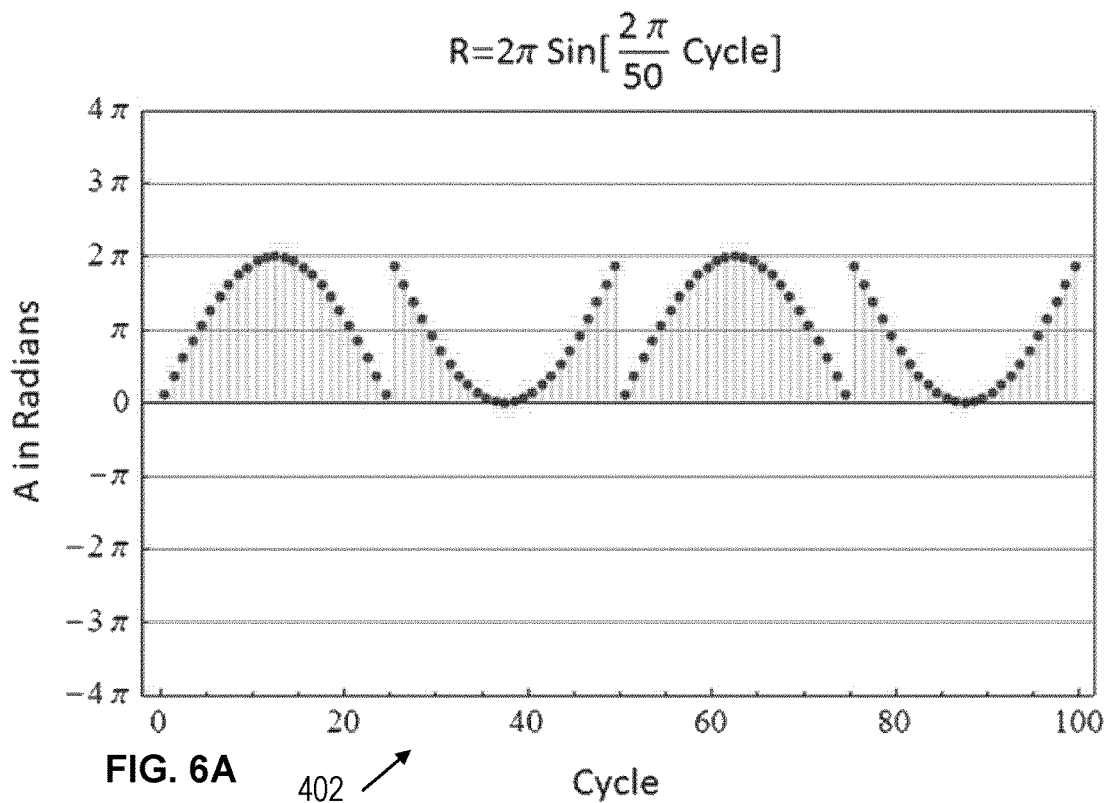
FIGS. 6A and 6B are graphs showing a phase wrapping effect on received signals.
Figure 6B:
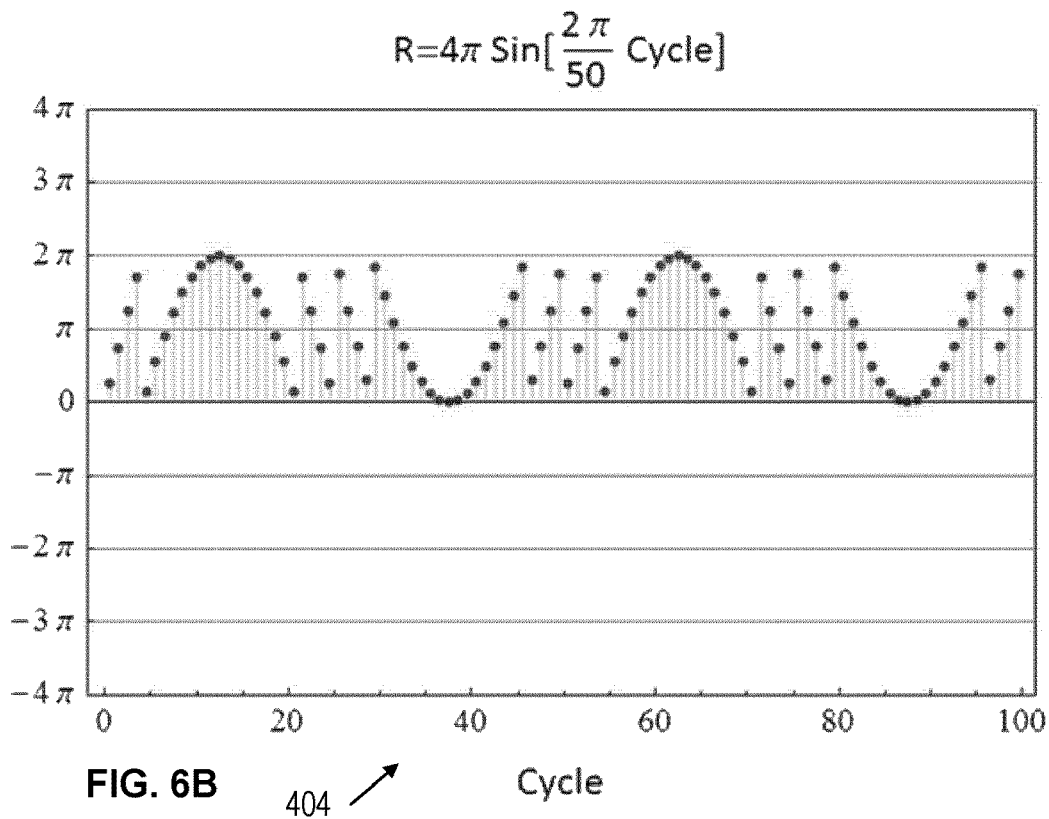
Figure 7A:
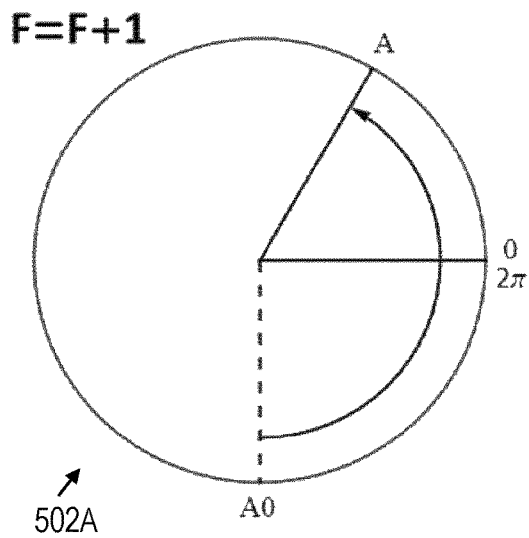
FIGS. 7A-7D are graphs showing fringe counting examples.
Figure 7B:
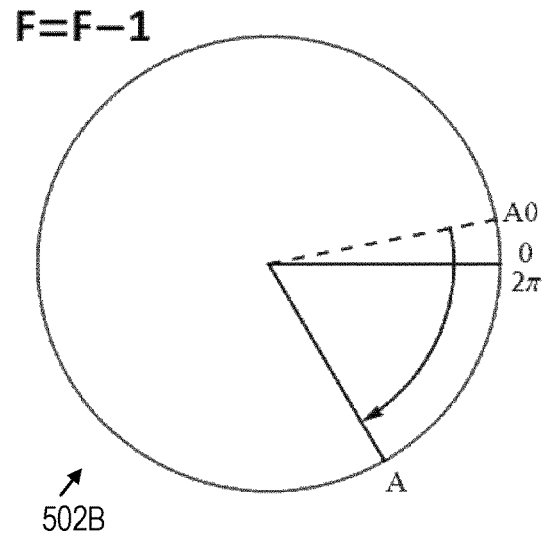
Figure 7C:
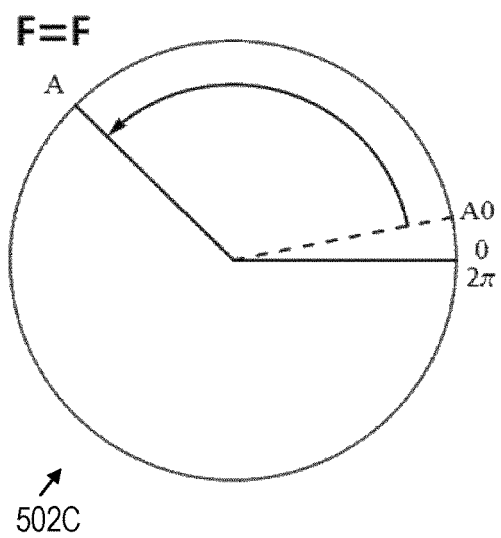
Figure 7D:
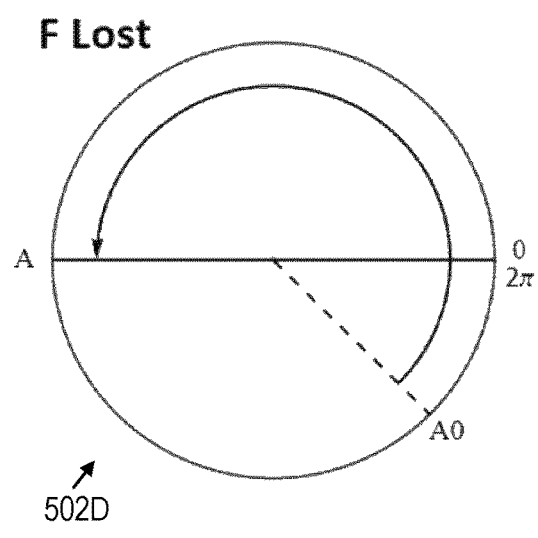

Electric fields due to single mode light are modeled as sinusoids in both time and position which means that the field $E_1$ looks unchanged with respect the field $E_2$ when their phase difference is changed by $2\pi$ radians which is one full fringe. The optical power samples are identical for full fringe shifts so the measured phase difference named A is limited to $2\pi$ interval which is chosen to be from 0 to just less than a radians in this demonstration. The charts 402 and 404 of FIGS. 6A and 6B show the phase difference A measured once each cycle where the sensor phase R is changing one period during 50 measurements with sinusoid amplitudes of $2\pi$ and $4\pi$ radians. The result is phase wrapping which does not reproduce the sensor phase R which should be a sinusoid. The conclusion is that the measure A derived from the optical samples during a cycle is not a good measure r of the sensor phase R and another approach is required.

Fringe Counting without Dynamic Phase Change Model

The function of a fringe counter F is to count $2\pi$ increments by considering the previous phase measurement and preserving the continuity of the phase. The increase or decrease of the phase A from its previous value A0 can be assumed to be less than $\pi$ radians which determines if the measured phase r, which is the polar coordinate of the unit circle, decreased clockwise or increased counterclockwise by assuming that the shorter arc from A0 to A was taken. An apparent decrease in the phase A by more than $\pi$ radians from the previous value A0 requires an increment of the fringe counter F to keep the arc less than $\pi$ radians. An apparent increase in the phase A by more than $\pi$ radians from the previous value A0 requires a decrement of the fringe counter F to keep the arc less than $\pi$ radians. The fringe counter F is unchanged when the new phase A and previous measurement A0 are less than $\pi$ radians apart. The fringe count F is not tracked correctly with an increase or decrease of more than $\pi$ radians between the new phase A and the previous phase A0. The previous phase A0 and the fringe counter F are set to zero for the first measurement of A. The measured phase r is the new phase A with the addition of the radians due to the signed fringe count F (i.e., $r = 2\pi \cdot F + A$).

The charts 502A-502D in FIGS. 7A-7D show different fringe count scenarios. More specifically, chart 502A shows a counterclockwise phase change between A0 and A that crosses the fringe and is less than $\pi$ radians. In such case, the fringe count F=F+1. In contrast, chart 502B shows a clockwise phase change between A0 and A that crosses the fringe and is less than π radians. In such case, the fringe count F=F−1. Chart 502C shows a counterclockwise phase change between A0 and A that does not cross the fringe. In such case, the fringe count remains the same (F=F). In chart 502D, a counterclockwise phase change between A0 and A crosses the fringe, but is more than π radians. In such case, the fringe count is lost. In accordance with at least some embodiments, fringe counting without a dynamic phase change model is performed as in the Fringe Count Process 1 of FIG. 8A. In Fringe Count Process 1, the previous measured phase A0 in the unit circle is compared to the new measured phase A to determine the change to apply to the fringe counter F in order to extend the measured phase r beyond the 2π interval that is the limit of A.

Fringe Counting with Dynamic Phase Change Model

In accordance with at least some embodiments, fringe counting is performed by comparing a new measured phase A with a reference phase predicted using a dynamic phase change model. For example, the dynamic phase change model may predict the reference phase by adding a phase change velocity component and/or a phase change acceleration component to the previous measured phase in the unit circle. In this manner, the measured phase r can be extended beyond the 2π interval that is the limit of A. In other words, a prediction r0 of the value of the measured sensor phase r includes the predicted value of the previous measured phase A0 in the unit circle added to a signed fringe counter F converted to radians (i.e., r0=2πF+A0). The prediction of A0 contained in r0 is better when r0 is closer to the value of the sensor phase R whose measure r contains the new phase measure A.

In at least some embodiments, the prediction A0 of the previous measured phase is extracted from the prediction r0 of the sensor phase. Using the convention previously established, the fringe counter F of the predicted sensor phase r0 is a signed integer and its unit circle phase A0 is in the range from 0 to less than 2π radians. Thus, dividing the estimate r0 by 2π results in a phase f expressed in unit circles which is a signed integer fringe count F plus a signed fraction of a unit circle (i.e., f=r0/2π=F+A0/2π). The signed integer fringe count F is extracted by taking the integer part of this ratio (i.e., F=IntegerPart[f]). For example, if f=2.6, then F=2. Meanwhile, if f=−2.6, then F=−2. The signed fraction of a fringe d can then be found by subtracting the signed integer fringe F from the phase f (i.e., d=f−F). If the fraction of a fringe d is negative, it can be made positive by taking one fringe from the integer count and adding it to the fringe fraction (i.e., if (d<0, then {F=F−1 and d=d+1}). The positive predicted previous measured phase A0 is the unit circle fraction converted to radians (i.e., A0=2π·d).

In at least some embodiments, this predicted previous measured phase A0 is compared to the new phase A to update the fringe counter F using the procedure described previously. The math to extract A0 from r0 may be changed to accommodate a different convention for the interval of the new measured phase A such as being restricted to an interval from −π to less than π radians or any other convention. The important improvement is that the measured phase in the unit circle A derived from the optical power samples in a cycle is compared to the phase A0 contained in the predicted phase r0, not the previous unit circle phase.

In accordance with at least some embodiments, the sensor input phase R can be viewed as a dynamically moving object with a previous constant value plus a change due to its previous velocity v and an additional change due to is previous acceleration a. In other words, the time between a new measurement and the previous measurement adds a change to the previous phase proportional to the velocity and the acceleration such that:

$$R0[k]=R[k-1]+v[k-1]\cdot(\tau[k]-\tau[k-1])+a[k-1]\cdot(\tau[k]-\tau[k-1])^2.$$

The prediction r0 of the value of the measured phase follows the trajectory of the sensor phase given by the previous measurement and the estimated changes due to the velocity and acceleration. The velocity and the acceleration estimates can be made from the previous sensor phase measurements r[k−1], r[k−2] and r[k−3] taken at times τ[k−1], τ[k−2] and τ[k−3]. The acceleration component assumes that the velocity is measured at the midpoint of its time interval such that:

$$r0(k) = r[k-1] + \left(\frac{r[k-1]-r[k-2]}{t[k-1]-t[k-2]}\right)\cdot(t[k]-t[k-1]) + \left(\left(\frac{r[k-1]-r[k-2]}{\tau[k-1]-\tau[k-2]} - \frac{r[k-2]-r[k-3]}{\tau[k-2]-\tau[k-3]}\right)\cdot\left(\frac{(\tau[k]-\tau[k-1])^2}{\frac{\tau[k-1]+\tau[k-2]}{2} - \frac{\tau[k-2]+\tau[k-3]}{2}}\right)\right).$$

With the above prediction, the current phase should be the previous phase changed by the previous measured velocity and the previous measured acceleration. The time of the measurements can be eliminated from the estimate when the time between the each measurement is the same such that:

$$r0[k]=r[k-1]+(r[k-1]-r[k-2])+((r[k-1]-r[k-2])-(r[k-2]-r[k-3])).$$

The addition of velocity and acceleration terms to the estimate of the sensor phase r allows a more accurate prediction since the sensor input phase R varies with time. Setting the estimates of the velocity and acceleration to zero gives the previously described method of phase unwrapping and is seen as a lower order approximation.

To summarize, a fringe counter without the dynamic phase change model ignores the velocity and acceleration and sets the estimated unit circle angle A0 to the previous value. In contrast, the disclosed fringe counter employs a dynamic phase change model that adds a velocity component and/or an acceleration component. These higher order estimates store the fringe counter in the estimate itself since the complete measured phase is used and not just the unit circle angle. In at least some embodiments, the time corresponding to each measurement r is stored for use with the velocity and/or acceleration estimates. Further, the initial times are assumed to be known from the measurement system. In accordance with at least some embodiments, fringe counting with a dynamic phase change model is performed as in the Fringe Count Process 2 of FIG. 8B.

Figure 9A:
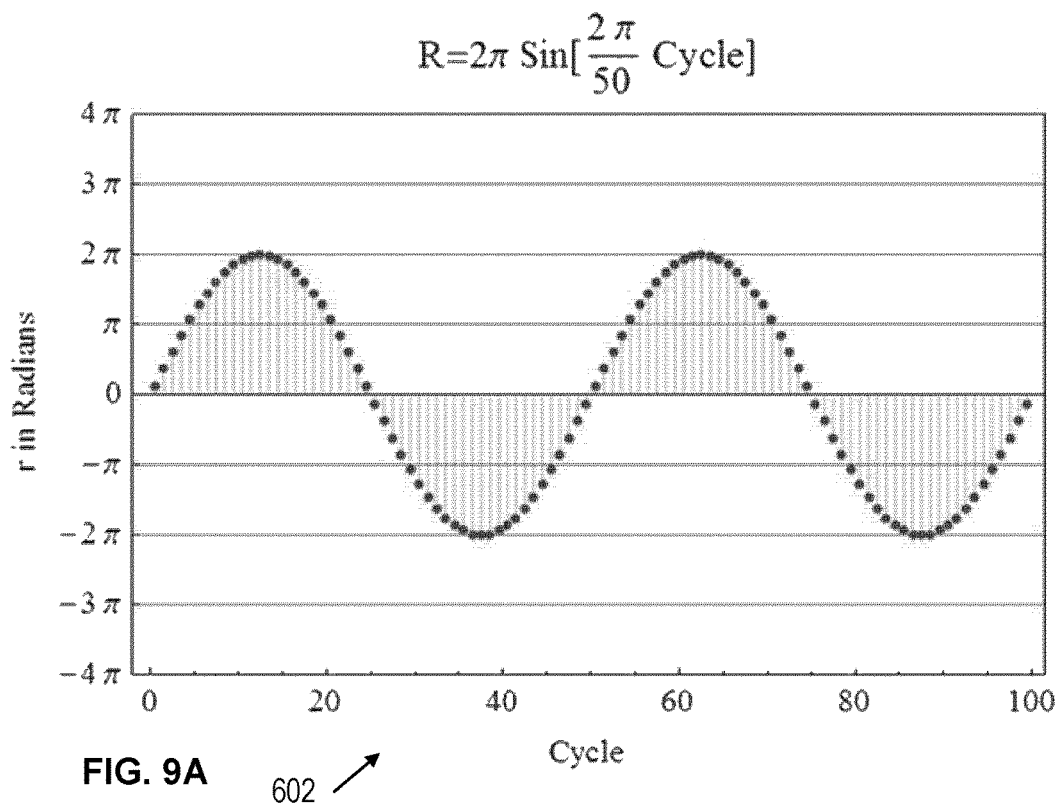
FIGS. 9A and 9B are graphs showing received signals after phase unwrapping using a dynamic phase change model is performed.
Figure 9B:
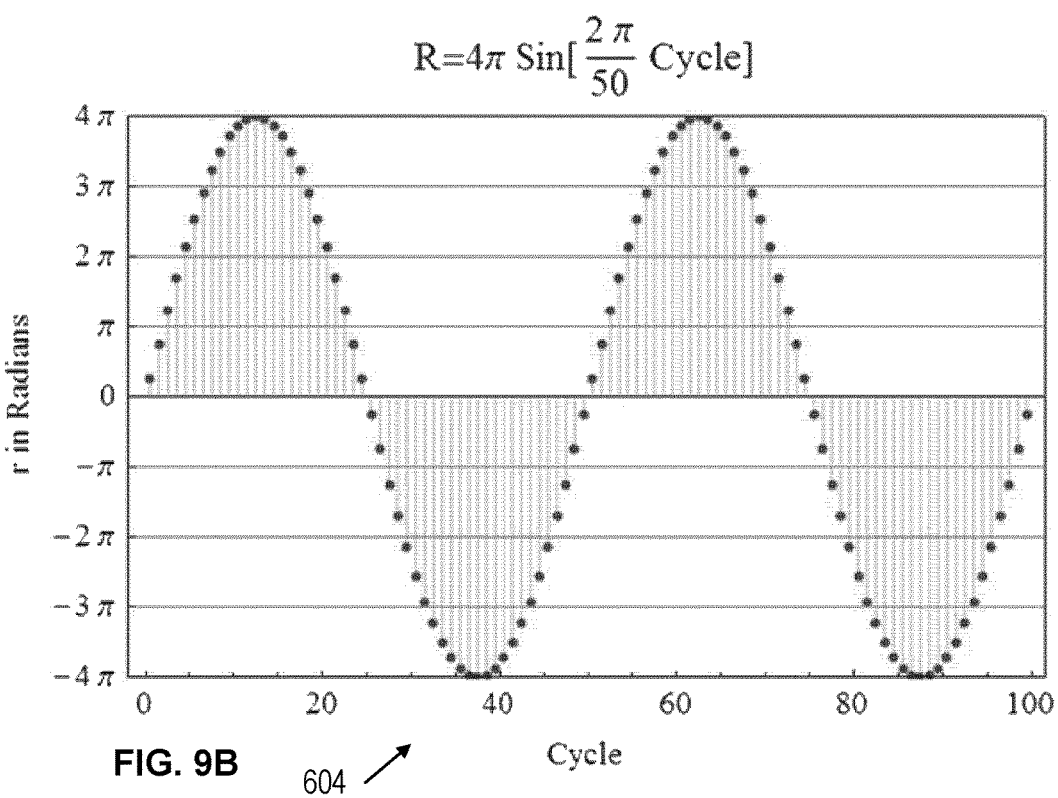

Using the Fringe Count Process 2 results in more accurate phase unwrapping compared to using the Fringe Count Process 1. The charts 602 and 604 of FIGS. 9A and 9B show the sensor phase measurement r measured once each cycle where the sensor phase R is changing one period during 50 measurements with sinusoid amplitudes of 2π and 4π radians. The sensor phase measurement r is now unwrapped and reflects the true sensor phase R which is a sinusoid in the example given.

Slew Rate Limit

The addition of a fringe counter involves an assumption about the continuity of the measured phase r between each measurement k. The condition that the value of the sensor phase R is less than π radians from the estimated value r0 is called the slew rate limit and causes failure of the fringe counter unless the following condition is met:

$$|R[k]-r0[k]|<\pi$$

The standard way to characterize a system is to compute its frequency response or how it responds to a single fixed frequency input. This can be done for the special case of the slew rate limit when the sensor phase R is a sine of amplitude Z radians and period T measurement cycles which is the inverse of the frequency. In such a case, the measurement index k becomes a cycle counter where a single measurement is taken of the sensor phase R during each measurement cycle such that:

$$R[k] = z\,\mathrm{Sin}\!\left[\frac{2\pi}{T}\cdot k\right]\text{ radians.}$$

In embodiments using Fringe Count Process 2, the slew rate condition with the estimate for equally spaced samples is used such that:

$$|R[k]-\{R[k-1]+(R[k-1]-R[k-2])+(R[k-1]-R[k-2])-(R[k-2]-R[k-3]))\}|<\pi$$

The Fringe Count Process 1 discards the changes due to the velocity and the acceleration and just compares the measured phase to the previous phase such that, for the special case being considered here:

$$\left| z\,\mathrm{Sin}\!\left[\frac{2\pi}{T}\cdot k\right] - z\,\mathrm{Sin}\!\left[\frac{2\pi}{T}\cdot(k-1)\right]\right| < \pi.$$

This simplifies to an equivalent expression which is the product of a constant amplitude times a cosine of the cycle counter as follows:

$$\left|2\cdot z\cdot\mathrm{Sin}\!\left[\frac{\pi}{T}\right]\cdot\mathrm{Cos}\!\left[\frac{2\pi\cdot k}{T}\right]\right| < \pi.$$

The cosine can be no larger than one which maximizes the expression. This places a condition on the amplitude as follows:

$$\left|2\cdot z\cdot\mathrm{Sin}\!\left[\frac{\pi}{T}\right]\right| < \pi.$$

The condition limits the absolute value of the input sine amplitude z to a maximum value Z depending on the period T of the sine such that:

$$Z[T] = \frac{\pi}{\left|2\,\mathrm{Sin}\!\left[\frac{\pi}{T}\right]\right|}.$$

The period T of the sine is the number of measurement cycles per sine period. At least two measurements are required per sine period to prevent aliasing according to the Nyquist condition so T is greater than or equal to two. The maximum amplitude for two measurements per sine period is therefore π/2 radians. The maximum amplitude approaches T/2 radians for large values of T.

The sine amplitude limit can be found in the same way when the velocity and acceleration components are added to the estimated phase r0. For comparison, various parameter values for Fringe Count Process 1 (previous phase only), Fringe Count Process 2A (previous phase plus a phase change velocity component), and Fringe Count Process 2B (previous phase plus a phase change velocity component plus a phase change acceleration component) are given in Table 1 shown in FIG. 10.

The Fringe Count Processes 1, 2A, and 2B give the same limit of π radians of sine amplitude when the input phase sine has a period T equal to six modulation cycles. Chart 702 of FIG. 11 shows a plot of the maximum sine amplitude in radians based on the slew rate limit versus the input sine period in measurement cycles for Fringe Count Processes 1, 2A, and 2B. More specifically, curve 704 corresponds to Fringe Count Process 1, curve 706 corresponds to Fringe Count Process 2A, and curve 708 corresponds to Fringe Count Process 2B. In chart 702, the Fringe Count Process 2A corresponding to curve 706 is shown to enable phase unwrapping up to a sensor sine amplitude that is about 30 times larger than Fringe Count Process 1 corresponding to curve 704 (assuming a 200 measurement cycle period). Meanwhile, the Fringe Count Process 2B corresponding to curve 708 is shown to enable phase unwrapping up to a sensor sine amplitude that is about 1000 times larger than Fringe Count Process 1 corresponding to curve 704 (again, assuming a 200 measurement cycle period).

Fringe Counter Initiation

In at least some embodiments, the first fringe counter update starts with the first unit circle measurement and no other measurements are available so that an accurate prediction of the new measured phase is not possible. This issue can be addressed by requiring the first measurement to be made during a period when the sensor phase is changing less than π radians between measurement times. The previous measurements used for the very first measurement are assumed to be zero which enables Fringe Count Process 1 counting until subsequent measurements are taken. Accordingly, in at least some embodiments, fringe counting may involve switching between Fringe Count Processes 1, 2A, and 2B depending on the measurements available and/or other conditions. For example, if the slew rate condition is violated, the data used for the reference phase prediction is invalid. In such case, the fringe counting is lost and may resume, for example, when the next quiet sensor period occurs. Thus, fringe counter initialization may be repeated as needed.

Performance

Fringe counting using the dynamic phase change model (Fringe Count Processes 2A and 2B, and/or switching between Fringe Count Processes 1, 2A and/or 2B) is effective even when the sensor phase changes by many multiples of 2π radians between measurements as long as each measurement is valid. However, it should be noted that the phase measurement is performed using samples of the optical power during the measurement cycle and, if the sensor phase is changing rapidly between optical power samples, the unit circle phase derived from those optical power samples could be invalid. This issue can be handled by taking samples of an optical pulse whose duration is much less than the time between measurements preventing the sensor phase from changing significantly during the pulse time.

Fringe Count Process 1 can be improved simply by increasing the measurement rate to decrease the change of the sensor phase to less than π radians between measurements. However, this approach is not possible for time domain multiplexed (TDM) scenarios where a single optical pulse is used to interrogate many sensors or optical fiber positions in series. (The measurement rate is limited to the maximum pulse rate where pulses cannot overlap in the sensor array). In pulsed TDM applications such as distributed acoustic sensing (DAS), phase unwrapping using the dynamic phase change model provides a significant advantage when reading high dynamic range sensor signals.

Figure 12:
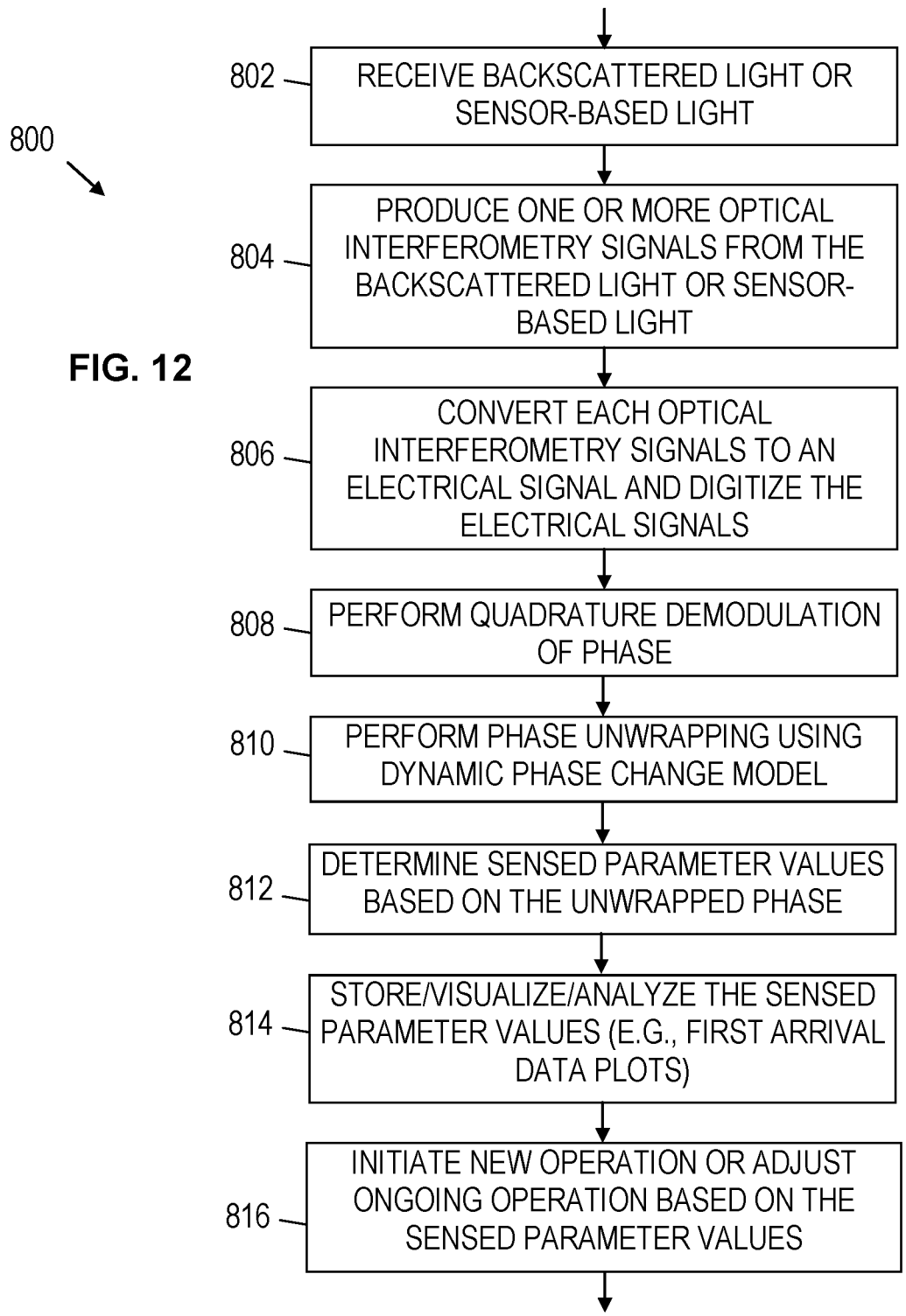
FIG. 12 is a flowchart showing an illustrative method involving phase unwrapping based on a dynamic phase change model.

FIG. 12 shows an illustrative method 800 involving phase unwrapping based on a dynamic phase change model. In method 800, backscattered light or sensor-based light is received at block 802. At block 804, one or more optical interferometry signals are produced from the backscattered light or sensor-based light. At block 806, each optical interferometry signal is converted to an electrical signal and is digitized. At block 808, quadrature demodulation of phase is performed using the digitized interferometry signals. At block 810, phase unwrapping is performed using a dynamic phase change model. For example, in at least some embodiments, the phase unwrapping involves fringe counting using Fringe Count Processes 2A or 2B. Further, Fringe Count Processes 1 may also be selectively used (e.g., at fringe counter initiation). At block 812, sensed parameters values are determined based on the unwrapped phase. At block 814, the sensed parameter values are stored, visualized, and/or analyzed. As an example, if the sensed parameter values correspond to acoustic data, first arrival data plots may be generated, stored, and/or displayed at block 814. At block 816, a new operation is initiated or an ongoing operation is adjusted based on the sensed parameter values. For example, the sensed parameter values obtained at block 812 and visualized/analyzed at 814 may be used for real-time fluid flow monitoring using acoustic signatures, flow-regime determination, wellbore integrity monitoring, event detection, seismic fracture monitoring, stimulation or treatment operations, production, etc.

Embodiments Disclosed Herein Include:

A: A system that comprises distributed sensors and a receiver that receives signals from the distributed sensors and that produces one or more interferometry signals from the received signals. The system also comprises a digitizer to digitize each of the one or more interferometry signals. The system also comprises at least one processing unit that processes each digitized interferometry signal to obtain unwrapped phase information and related parameter values, wherein the unwrapped phase information is obtained based on a comparison of a current phase measurement with a reference phase predicted using a dynamic phase change model.

B: A method that comprises receiving signals from distributed sensors and producing one or more interferometry signals from the received signals. The method also comprises digitizing each of the one or more interferometry signals. The method also comprises processing each digitized interferometry signal to obtain unwrapped phase information and related parameter values. The unwrapped phase information is obtained based on a comparison of a current phase measurement with a reference phase predicted by a dynamic phase change model.

Each of embodiments A and B may have one or more of the following additional elements in any combination: Element 1: the dynamic phase change model includes a phase change velocity component. Element 2: the at least one processor determines a value for the phase change velocity component by tracking at least two previous phase measurements as a function of time. Element 3: the at least one processor predicts the reference phase by combining a phase change corresponding to the phase change velocity component with a previous phase measurement. Element 4: the dynamic phase change model includes a phase change acceleration component. Element 5: the at least one processor determines a value for the phase change acceleration component by tracking at least two previous phase velocity measurements as a function of time. Element 6: the at least one processor predicts the reference phase by combining a phase change corresponding to the phase change acceleration component with a previous phase measurement. Element 7: the at least one processing unit uses a result of the comparison to update a fringe counter value. Element 8: the distributed sensors correspond to an optical fiber deployed downhole via at least one of drill pipe, coiled tubing, slick line or electric line, or spooled off of a component that is dropped or pumped downhole. Element 9: further comprising a monitor in communication with the at least one processing unit to display the unwrapped phase information, the parameter values, or data derived from the unwrapped phase information or the parameter values. Element 10: the parameter values correspond to downhole acoustic data, and wherein the at least one processor causes first arrival data derived from the downhole acoustic data to be stored or displayed. Element 11: further comprising a tool that initiates or adjusts an operation based on the parameter values, or data derived from the parameter values.

Element 12: the dynamic phase change model includes at least one of a phase change velocity component and a phase change acceleration component. Element 13: further comprising predicting the reference phase by combining at least one of a phase change corresponding to the phase change velocity component and a phase change corresponding to the phase change acceleration component with a previous phase measurement. Element 14: further comprising updating a fringe counter value based on a result of the comparison. Element 15: further comprising deploying the distributed sensors downhole via at least one of drill pipe, coiled tubing, slick line or electric line, or by spooling an optical fiber off of a component that is dropped or pumped downhole. Element 16. further comprising displaying the unwrapped phase information, the parameter values, or data derived from the unwrapped phase information or the parameter values. Element 17: further comprising storing or displaying first arrival data derived from downhole acoustic data corresponding to the parameter values. Element 18: further comprising initiating or adjusting an operation based on the parameter values, or data derived from the parameter values.

Numerous variations and modifications will become apparent to those skilled in the art once the above disclosure is fully appreciated. It is intended that the following claims be interpreted to embrace all such variations and modifications.

What is claimed is:

1. A system, comprising:
   distributed sensors;
   a receiver that receives signals from the distributed sensors and that produces one or more interferometry signals from the received signals;
   a digitizer to digitize each of the one or more interferometry signals; and
   at least one processing unit that processes each digitized interferometry signal to obtain unwrapped phase information and related parameter values, wherein the unwrapped phase information is obtained based on a comparison of a current phase measurement with a reference phase predicted using a dynamic phase change model that includes a phase change acceleration component.

2. The system of claim 1, wherein the dynamic phase change model includes a phase change velocity component.

3. The system of claim 2, wherein the at least one processing unit determines a value for the phase change velocity component by tracking at least two previous phase measurements as a function of time.

4. The system of claim 2, wherein the at least one processor predicts the reference phase by combining a phase change corresponding to the phase change velocity component with a previous phase measurement.

5. The system of claim 1, wherein the at least one processor determines a value for the phase change acceleration component by tracking at least two previous phase velocity measurements as a function of time.

6. The system of claim 1, wherein the at least one processor predicts the reference phase by combining a phase change corresponding to the phase change acceleration component with a previous phase measurement.

7. The system of claim 1, wherein the at least one processing unit uses a result of the comparison to update a fringe counter value.

8. The system of claim 1, wherein the distributed sensors correspond to an optical fiber deployed downhole via at least one of drill pipe, coiled tubing, slick line or electric line, or spooled off of a component that is dropped or pumped downhole.

9. The system of claim 1, further comprising a monitor in communication with the at least one processing unit to display the unwrapped phase information, the parameter values, or data derived from the unwrapped phase information or the parameter values.

10. The system of claim 1, wherein the parameter values correspond to downhole acoustic data, and wherein the at least one processor causes first arrival data derived from the downhole acoustic data to be stored or displayed.

11. The system of claim 1, further comprising a tool that initiates or adjusts an operation based on the parameter values, or data derived from the parameter values.

12. A method, comprising:

receiving signals from distributed sensors and producing one or more interferometry signals from the received signals;

digitizing each of the one or more interferometry signals; and processing each digitized interferometry signal to obtain unwrapped phase information and related parameter values, wherein the unwrapped phase information is obtained based on a comparison of a current phase measurement with a reference phase predicted by a dynamic phase change model that includes a phase change acceleration component.

13. The method of claim 12, wherein the dynamic phase change model includes a phase change velocity component.

14. The method of claim 13, further comprising predicting the reference phase by combining at least one of a phase change corresponding to the phase change velocity component and a phase change corresponding to the phase change acceleration component with a previous phase measurement.

15. The method of claim 12, further comprising updating a fringe counter value based on a result of the comparison.

16. The method of claim 12, further comprising deploying the distributed sensors downhole via at least one of drill pipe, coiled tubing, slick line or electric line, or by spooling an optical fiber off of a component that is dropped or pumped downhole.

17. The method of claim 12, further comprising displaying the unwrapped phase information, the parameter values, or data derived from the unwrapped phase information or the parameter values.

18. The method of claim 12, further comprising storing or displaying first arrival data derived from downhole acoustic data corresponding to the parameter values.

19. The method of claim 12, further comprising initiating or adjusting an operation based on the parameter values, or data derived from the parameter values.

* * * * *